United States Patent

[11] 3,581,050

[72] Inventors: Kenneth William Brown; Nigel C. Balchin, both of Cambridge, England
[21] Appl. No. 748,536
[22] Filed July 29, 1968
[45] Patented May 25, 1971
[73] Assignee National Research Development Corporation London, England
[32] Priority Aug. 1, 1967
[33] Great Britain
[31] 35204/67

[54] ELECTRIC ARC-WELDING SYSTEMS
9 Claims, 6 Drawing Figs.
[52] U.S. Cl. .................................................... 219/130, 219/131
[51] Int. Cl. .................................................... B23k 9/00
[50] Field of Search ........................................ 219/130, 131, 131 (R), 131 (F), 136, 137

[56] References Cited
UNITED STATES PATENTS
| | | | |
|---|---|---|---|
| 2,686,239 | 8/1954 | Burbeck | 219/132X |
| 3,267,251 | 8/1966 | Anderson | 219/125 |
| 3,317,811 | 5/1967 | Normando | 219/131X |
| 3,350,539 | 10/1967 | Manz et al. | 219/131X |

Primary Examiner—J. V. Truhe
Assistant Examiner—C. L. Albritton
Attorney—Kemon, Palmer & Estabrook ABSTRACT: Different preselected combinations of the values of welding parameters in a consumable electrode arc-welding process are obtained when a selector switch is moved through its different positions. The switch is inserted into the hub of the reel of electrode wire which is to be fed to the welding torch. The reels are coded so that the switch is moved to a position which will select a combination of values appropriate for the wire carried by that reel.

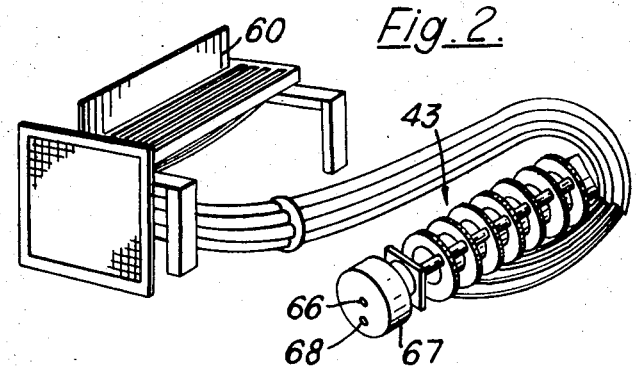
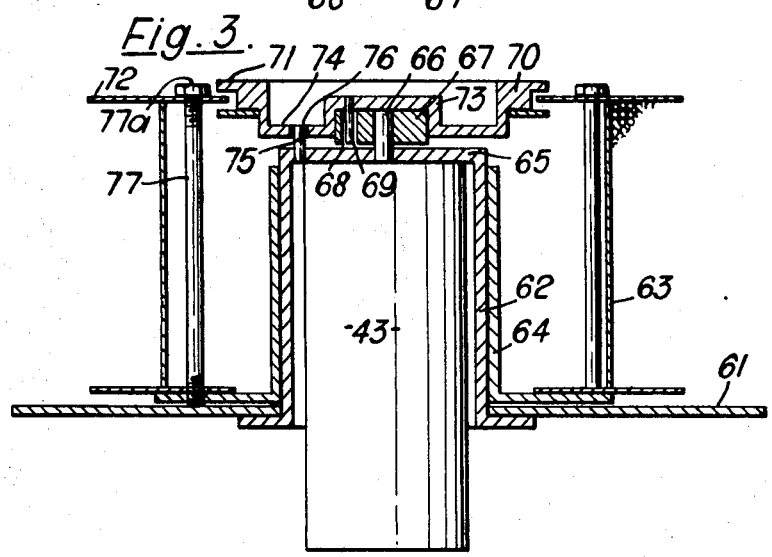
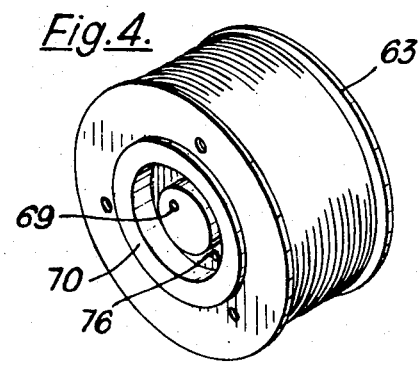

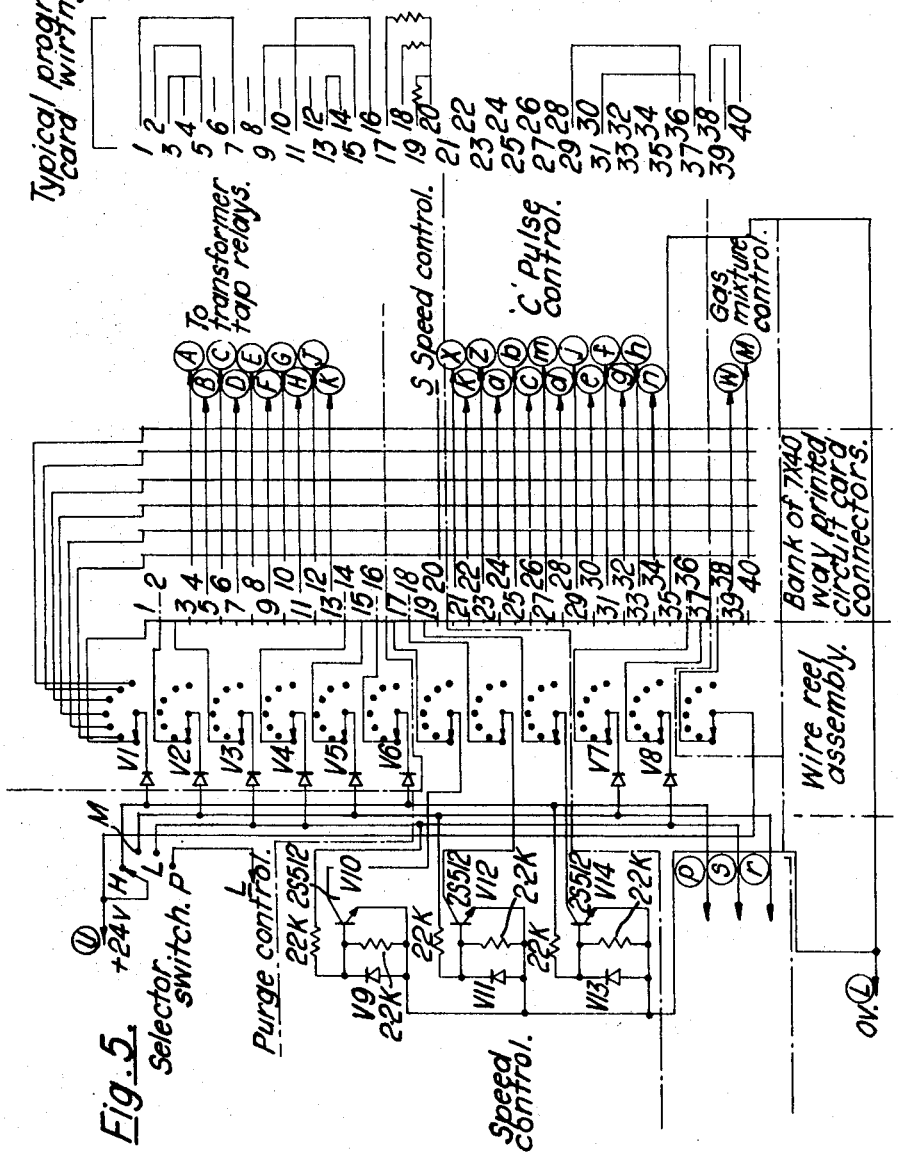

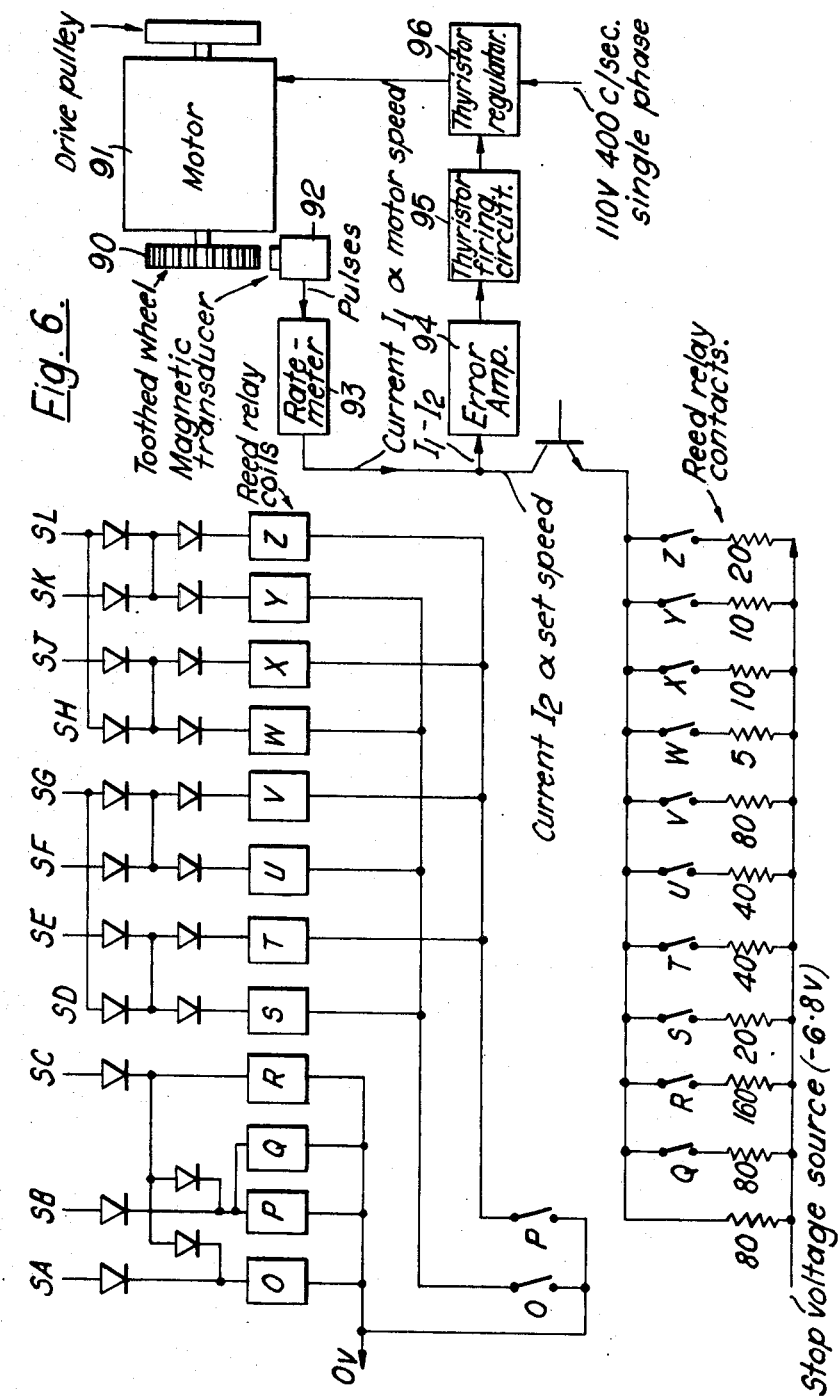

ELECTRIC ARC-WELDING SYSTEMS

In consumable electrode, electric arc, welding processes, successful and consistent welds are only obtained if the values of each one of a number of interdependent variables are correctly chosen to suit the particular type of weld being made. The correct choice involves a high degree of understanding of the many factors which influence the quality of the weld, and a wrong choice of any one variable is likely to upset the relationship between the other variables. For example, in dip-transfer $CO_2$ welding, the rate at which wire is fed to the arc must be closely correlated with the open circuit power supply voltage and with the circuit inductance.

We have found that for any given workpiece material and joint configuration, although there is an "ideal" welding condition, an acceptable weld can be made if the various parameters lie within predetermined tolerance ranges. Since the parameters are all interdependent, a tolerance for one parameter may vary according to the value of another parameter and create an area within which acceptable welds can be made. For any joint configuration (i.e. the geometry and orientation of the material to be joined) there will be a single area, but the parameters for different joint configurations will form different areas for different types of weld and welding position. However, for a given job material (i.e. the composition of the material being welded) and a given electrode material, the areas will overlap to give a final common zone in which acceptable welds can be made whatever joint configuration is adopted. Outside the zones lie generally unworkable conditions. We have discovered that when welding different thicknesses of a given job material, the parameters for a whole range of joint configurations surprisingly all fall within a few distinct zones. For example, when welding ⅛-inch to ½-inch mild steel, a whole range of joint configurations can be covered by only three zones, using 3/64-inch diameter electrode wire and argon—5 percent oxygen shielding gas.

Hence, for certain applications where fine control of the various welding parameters is not justified by the comparatively small differences made to the quality of the weld once the welding conditions lie within one of the common zones, a welder using the correct electrode wire need have control only of a master setting for switching between the different common zones corresponding to different thicknesses of job material.

The present invention is therefore concerned with an electric arc-welding system which includes a welding torch, drive means for feeding a supply of a consumable electrode to the arc, a power supply having means for varying the power fed to the welding torch, and means for controlling the wire feed speed. Different values of the required power and wire feed speed are selected by energization of predetermined actuators connected to the said power-varying means and the speed control means respectively and the system further includes an electrical selector unit for linking different preselected combinations of the actuators.

The selector unit includes a plurality of fixed electrical linking circuits having output connections to the said actuators, and connected to different positions on a key switch. The key switch is connected to a voltage source and hence as the switch is moved through its different positions different combinations of actuators are energized in turn. The different combinations are preselected to produce acceptable welds over a wide range of joint configurations for a given electrode wire. An important feature of the present invention is the provision of means responsive to the assembly of the wire carrier into its mounting for automatically selecting the appropriate combination for that wire.

Thus it can be seen that the different combinations of welding parameters which will be required for particular electrode wires are preselected in the selector unit and the operator, or his assistant, then selects the correct combination for a given wire simply by assembling the wire carrier into its mounting assembly.

The main application of such a welding system will be in improving the consistency and quality of welds made under all types of conditions, without taking control of the operation completely out of the hands of the welder. A zone selector switch may also be connected between the voltage source and the key switch. This is operable by the operator, or his assistant, and for a given wire, will connect the voltage source to different points in the selected circuit in the selector unit to modify the chosen parameters to permit welding of different thicknesses of a given job material. A welder is thus able to concentrate on improving his technique rather than judging what particular values of the various parameters he requires.

By way of example one embodiment of the invention will now be described with reference to the accompanying drawings, in which:

FIG. 2 shows a pictorial layout of a rotary selector switch for use in the control system shown in FIG. 1;

FIG. 3 is a cross section of the electrode wire carrier used in the control system of FIG. 1;

FIG. 4 is a pictorial representation of the electrode carrier shown in FIG. 3;

FIG. 5 shows the circuit wiring of a typical program selector unit for use with the control system of FIG. 1; and FIG. 6 shows a motor speed control circuit for use in the control system of FIG. 1.

Figure 1:
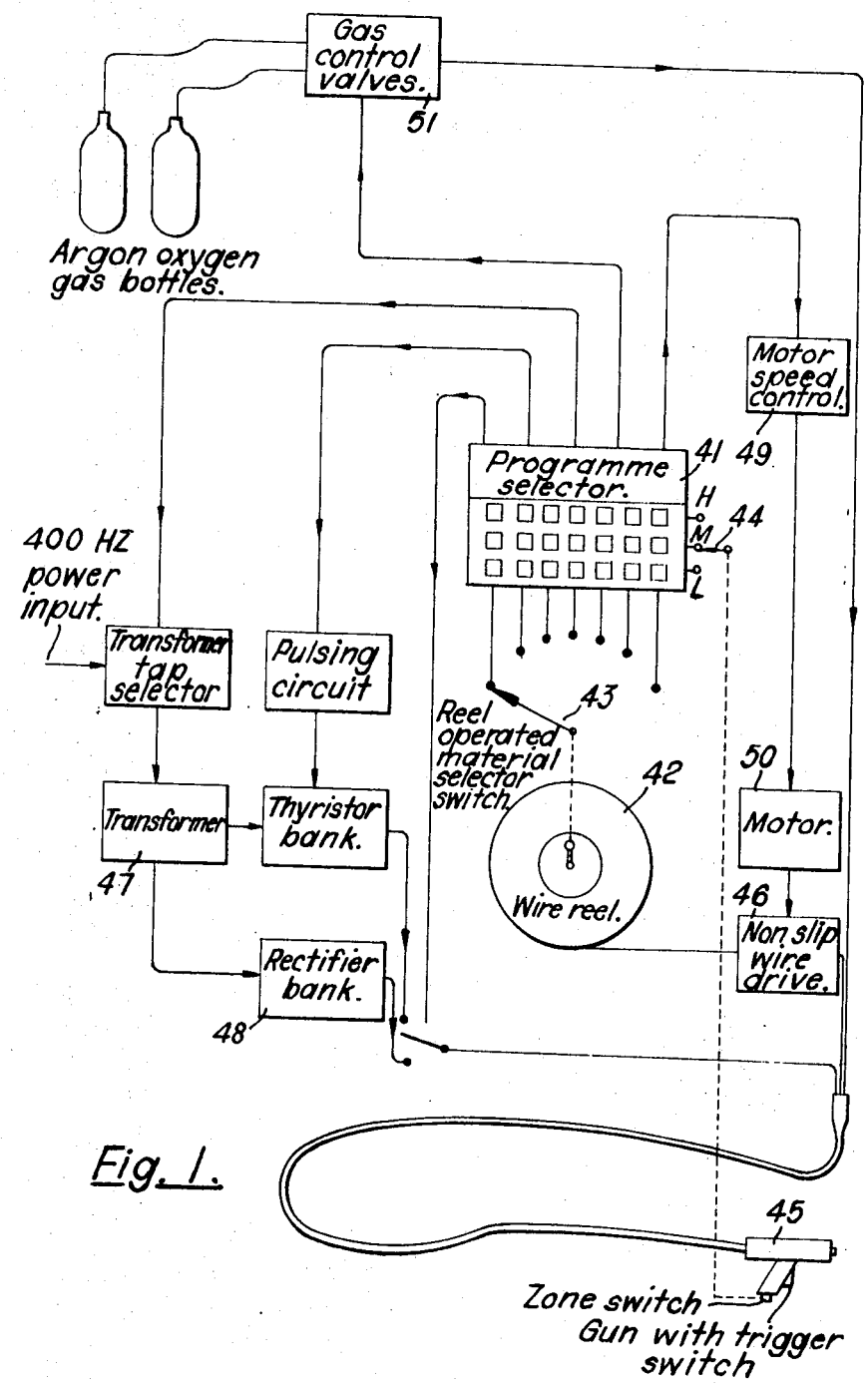
FIG. 1 is a diagrammatic illustration of the control system in a consumable electrode arc-welding system for selecting different combinations of welding parameters.

Referring to FIG. 1, the program selector 41 includes a number of program cards having fixed electrical linking circuits for interconnecting different combinations of the welding variables. The wire reel 42 is coded according to its material, and selects one of the program cards by means of the reel-operated key switch 43. The particular zone (high, medium or low) is then selected by the operator with a zone switch 44 which may either be mounted on the program selector or on the welding torch 45. The different program cards are selected automatically when the wire reel 42 is assembled into its mounting assembly. The carrier includes a coded disc with a key for locking the carrier into position on the assembly so that a rotary switch mounted within the carrier is turned to a predetermined position. The automatic selection of the correct program card for a particular electrode wire is explained more fully hereinafter with reference to FIGS. 4, 5 and 6. Once the program card has been selected the combination of variables thereby selected can be modified by means of the zone switch 44.

The nonslip drive 46 may comprise an endless belt drive with high tractive effort and low distributed load on the wire, the wire being passed around the rim of a large wheel. Such a wire drive is more fully described and separately claimed in our copending British application No. 20838/66. The power supply consists of a delta-star transformer 47 feeding a three-phase bridge rectifier 48. The primary of the transformer is fed from a 400 Hz. power input and includes a number of fine and coarse taps to provide a range of open circuit arc voltages. The transformer tap connections are made by relays, operated from the program card which has been selected by the reel-operated key switch 43 and further by the zone switch 44.

The motor speed control 49 connected to the motor 50 for driving the wire feed device is controlled from relays connected to the program selector and is shown more fully in FIG. 6. The gas control valves 51 regulate the flow of shielding gas to the arc and are controlled from relays connected to the program selector.

In FIG. 2 a program card unit is shown with one program card 60 in position. A program card is selected by the seven-way rotary key switch 43. The program card and the rotary switch are assembled into a fixed casing 61 (FIG. 3) with a center hollow hub portion 62. Electrode wire is wound on a "throwaway" carrier spool 63 which is mounted on three equiangular spaced driving pins 77 upstanding from a flange of a center hub portion 64 which is rotatable on the fixed hub 62 of the casing 61. Projecting through the end plate 65 of the fixed hub 62 is a spindle 66 of the switch 43 which is secured to the end plate 65. On the switch spindle 66, is a boss 67 wherein, offset from the axis of the switch spindle 66 is formed a hole 68 by which the switch can be rotated and set in any one of its seven positions by means of a driving peg 69 projecting from a removable portion of the wire carrier spool 63.

The removable portion consists of a coded disc 70 which has a peripheral groove 71 in which the inner periphery of the outer plate 72 of the spool 63 is loosely mounted so that the wire carrier spool 63 can rotate independently of the coding disc 70. The coding disc 70 has a center hub 73 which fits over the boss 67 of the switch spindle 66 and carries the driving peg 69 which fits into the hole 68 in the switch spindle boss 67.

Upstanding from the end plate 65 of the fixed hub 62 is a fixed dowel pin 75 which is adapted to mate with a coding hole 76 in the baseplate 74 of the coding disc. As the switch has seven possible angular outlet positions the coding hole 76 is positioned on the disc in one of seven angular positions around the center hub thereof relative to the peg 69 according to the electrode wire material identified thereby.

To assemble the spool 63 into the fixed casing 61 and establish the coding key connections therefore entails the alignment of both the peg 69 and the coding hole 76 on the coding disc with complimentary mating components. Thus, the spool 63 is first mounted on the pins 77 (later secured by nuts 77a) and then the peg 69 is engaged in the hole 68 in the switch boss 67, thereby establishing a driving connection by which the switch may be rotated until the coding hole 76 coincides with the fixed dowel pin 75. This establishes the correct setting of the reel-operated material selector switch 43 in FIG. 1.

FIG. 5 shows the general electrical layout of the program control circuit. The various major sections of the circuit are indicated by chain dotted lines with appropriate identifying captions. For clarity, the wiring from the zone selector switch on the gun to the program card is shown for only one pole of the reel-operated key switch and for one card. A typical program card wiring is shown on the right-hand side of the figure.

Apart from the high, medium and low settings of the zone selector switch on the gun, there is a further position—purge (p) which enables the operator without an extra control, to feed shielding gas through the system to displace any preexisting gas without feeding electrode wire or supplying welding current.

As mentioned previously, the voltage selection in the power source is obtained by tapping the transformer primary and energizing predetermined relays connected to the output of the selector unit to bring different tapped portions of the primary into the circuit.

In FIG. 5 the program card contacts 1 to 16 are connected to the relays to provide the appropriate power supply to the welding gun. The diodes V1 to V6 allow the same tap to be selected for more than one selector switch position without applying operating voltage to lines other than those selected. However, no connection may be made directly on the card between any two output contacts which are common across the card sockets e.g. 5 and 6. In consequence, separate feed points are provided for coarse and fine tap selectors. Diodes V1 to V6 are connected to the selector switch. In the purge position of this switch no tapping relays are energized and therefore no voltage is supplied to the main transformer.

The motor speed control circuit for controlling the wire feed rate involves the contacts 17 to 20 on the program card and operates by earthing one end of one resistor of three connected to point S (which is in the speed control system) via isolating transistors V10, V12 and V14 for the speeds corresponding to the L, M and H welding settings on the zone selector switch.

The program card contacts 21 to 34, 36 and 37 are concerned with pulse welding and act similarly to the transformer tap selection mentioned above. Continuous current operation is required on the highest setting (H) for any material and hence the line from the H position of the selector switch is taken to a pulse circuit supply (not shown) over the lead P to operate a circuit which cuts out the pulse circuit supply and provides a continuous current supply. On the medium (M) setting a high pulse frequency is directly selected and on the low (L) setting a lower frequency is selected.

The motor speed control system will now be described with reference to FIG. 6. Output buses SA to SL are shown connected through diode networks to the relays O to Z. The corresponding contacts are shown connected to resistors which are connected to a stabilized voltage source. The conductance value of each resistor gives so many inches per minute wire feed rate if in circuit. The resulting current is fed to a velocity servosystem with feedback from a tachometer. In the figure the conventional tachometer is replaced by 12 toothed wheel 90 attached to the drive motor 91 and a magnetic transducer 92 together with a rate meter 93. The rate meter produces a current I1 portional to the motor speed and this is compared with the current from the resistances which represent the required speed. The error current I1 −I2 is fed to an error amplifier 94 and controls a thyristor-firing circuit 95 which alters the firing angle of a thyristor regulator 96 so that the motor speed is altered to balance the two currents and so obtain the required speed.

We claim:

1. A consumable electrode, electric arc, welding system comprising;
   a. a welding torch;
   b. a supply of consumable electrode wire;
   c. a carrier for said supply of electrode wire;
   d. a mounting assembly for holding said carrier;
   e. drive means for feeding said electrode wire to said welding torch;
   f. control means for varying the speed at which said electrode wire is fed to said torch;
   g. a power supply for said welding torch;
   h. means for varying the power fed to said torch;
   i. a plurality of actuators connected to said speed control means and said power-varying means;
   j. a voltage source for energizing said actuators, different combinations of wire feed speed and power being selected by energization of predetermined actuators connected to said speed control means and power-varying means respectively;
   k. a selector unit including a plurality of electrical linking circuits for linking different combinations of said actuators;
   l. a key switch connected between said voltage source and said selector unit, each position of said key switch connecting said voltage source to one of said linking circuits and
   m. means for turning said key switch to a position at which correct values of the wire feed speed and power are selected in accordance with said electrode wire on said carrier.

2. Apparatus according to claim 1 further comprising a plurality of carriers for different electrode wires and means responsive to the assembling of a carrier on to said mounting assembly for automatically moving said key switch to select a combination of said values appropriate to the electrode wire on said assembled carrier.

3. Apparatus according to claim 2 further comprising a manually operable selector switch connected between said key switch and said selector unit such that said voltage source is connected to different input connections of the linking circuit selected from said key switch and said values of wire feed speed and power are thereby further modified to permit welding of different thicknesses of a given job material.

4. Apparatus according to claim 1, in which said wire carrier includes a codes disc portion and a rotatably mounted central hub portion for housing said key switch, one end of said key switch including a boss mounted on a spindle, and said coding disc including means for forming a driving connection between said coded disc and said switch such that the position of said key switch is fixed with respect to said disc, and in which said mounting assembly includes a protruding pin and said coded disc includes a corresponding socket for said pin whereby to mount said carrier on said mounting assembly the key switch must be rotated until said pin mates with said socket.

5. Apparatus according to claim 1, in which said means for varying the power fed to said welding torch comprises tappings on a mains transformer supplying power to said welding torch, the said tappings being selected in response to the energization of preselected ones of said actuators.

6. Apparatus according to claim 1, in which different shielding gas supplies are supplied to said welding torch through control valves, said control valves being opened or closed in response to the energization of preselected ones of said actuators.

7. Apparatus according to claim 1, further comprising an inductance connected between said power supply and said welding torch, the inductance including a number of tappings, said tappings being selected in response to the energization of preselected ones of said actuators.

8. Apparatus according to claim 1, in which said drive means for feeding the supply of consumable electrode to said welding torch includes a drive wheel driven from a motor, said means for varying the wire feed speed comprising a servo-operated control for said motor in response to energization of preselected ones of said actuators.

9. Apparatus according to claim 8, including a magnetic transducer and rate meter for producing a current proportional to the speed of a toothed wheel connected to said motor, said selector unit feeding a current proportional to the required speed in response to the energization of preselected ones of said actuators, and an error amplifier and thyristor-firing circuit altering the firing angle of a thyristor regulator such that said motor speed is altered to balance the two currents and the motor runs at the desired speed.